Oct. 18, 1938.　　　　R. L. SHUMAN　　　　2,133,310
PROCESS FOR PRODUCING ARYL PHOSPHATES
Filed Nov. 20, 1935
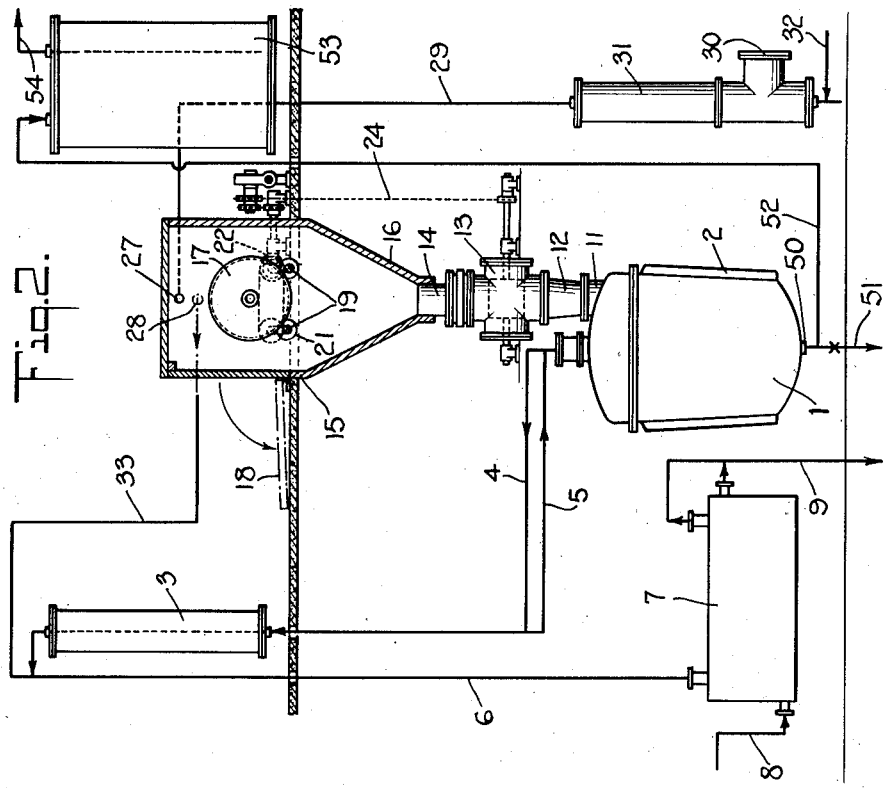
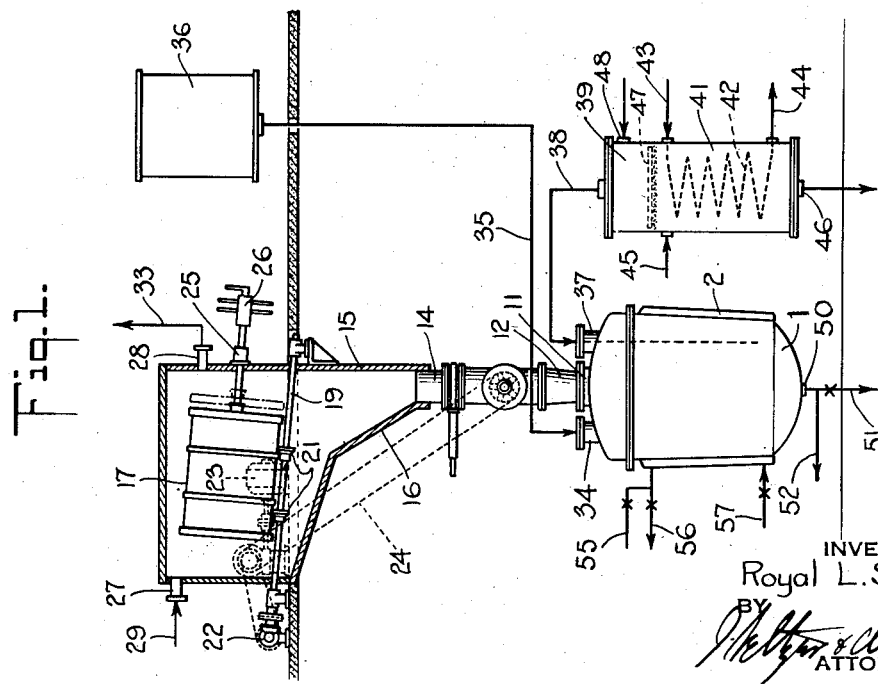
INVENTOR
Royal L. Shuman
BY
ATTORNEY

# UNITED STATES PATENT OFFICE 2,133,310

PROCESS FOR PRODUCING ARYL PHOSPHATES

Royal L. Shuman, Newark, N. J., assignor to Celluloid Corporation, a corporation of New Jersey Application November 20, 1935, Serial No. 50,714

19 Claims. (Cl. 260—461)

This invention relates to the preparation of aryl phosphates and more particularly to the preparation of tricresyl phosphate by the treatment of cyclo hydroxylic compounds with phosphorus pentachloride.

Heretofore aryl phosphates have been prepared by treating aryl acids with a phosphorus compound, particularly phosphorus oxychloride, at relatively high temperatures, namely about 300° C. and for long periods of time. Other processes involving phosphorus halides have necessitated the use of two reaction chambers. In all processes heretofore employed it was required that the ingredients entering into the basic reaction be absolutely dry.

It is an object of the invention to prepare aryl phosphates by a process using phosphorus pentachloride wherein the reactions necessary to form the phosphates are carried out simultaneously and in one reaction chamber. Another object of the invention is the production of aryl phosphates using phosphorus pentachloride wherein the aryl acids, i. e., cyclo hydroxylic compounds, and other reagents and ingredients need not be introduced into the reaction in an absolutely dry condition. Another object of the invention is to prepare aryl phosphates at or near room temperature, thus producing light colored aryl phosphates as the reaction at the lower temperatures avoid charring, decomposition, degradation or tarry substances associated with the making of aryl phosphates at high temperatures. Other objects of the invention will appear from the following detailed description.

Any suitable device may be employed for carrying out my invention. However, a preferred device for carrying out my invention, which device forms a part of my invention, is shown in the accompanying drawing. In the drawing, wherein like reference numerals refer to the same or similar elements, Fig. 1 is a side view, partly in section, of an apparatus for use in forming aryl phosphates, and Fig. 2 is an end view, partly in section, of the apparatus shown in Fig. 1.

Among the advantages of this invention is that aryl phosphates may be prepared without the aid of applied heat, with a much shorter reaction period, higher yields, use of chemicals that are not absolutely dry and in a single step and apparatus. The production of aryl phosphates, by the process of this invention, is economical and adapted to large scale production and is simple compared with prior methods wherein prolonged heating up to and above 300° C. is employed. The aryl phosphates may be produced by treating in the apparatus herein described, or in a similarly functioning apparatus, any of the homologues of phenol with phosphorus pentachloride and simultaneously adding moisture, preferably in the form of a vapor, such as moist air, to complete the reaction. Hydrogen sulphide may be substituted for moisture to produce the thiophosphates. The chemical reactions taking place are probably as follows:

(1) 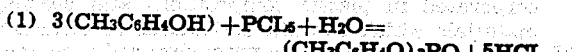

(2) 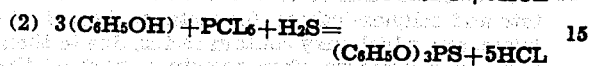

In the foregoing, cresol and phenol are simply used to illustrate the probable reactions which take place. However, any of the hydroxy derivatives of the benzene series, for instance, the phenols, may be employed. Classified under the name of phenols, including phenol itself, are the isomeric cresols and xylenols and their higher homologues. Under the generic term phenols it is intended to include not only the monohydric but also the polyhydric phenols, such as resorcinol, and also the naphthols. More generally stated, any of the hydroxy derivatives of carbocyclic hydrocarbons wherein the hydroxy radicle is attached to the nucleus may be employed. Also, mixtures of two or more of these compounds, or mixtures of all of them, such as is found in tar acids commercially sold under the name of cresylic acid, may be used. The products resulting from this reaction may be homogeneous phosphoric esters of hydroxy derivatives of the benzene series, such as phenol, cresol, etc., or they may be mixed esters of phosphoric acid, depending upon the materials used. These esters are generally known and described as aryl phosphates.

In addition to the aryl phosphates described above, phosphates from the naphthols (alpha and beta naphthols) and ring alcohols of the hydro-aromatic carbons, such as cyclohexanol and methyl cyclohexanol may be made by this process.

The structure of homogeneous phosphoric acid esters may be represented as follows:

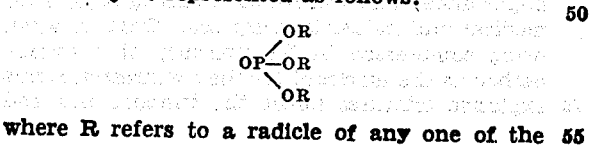

where R refers to a radicle of any one of the foregoing described carbocyclic compounds, for instance phenol.

The structure of the mixed phosphoric acid esters may be represented as follows:

where $R_1$, $R_2$ and $R_3$ represent different radicles of aromatic compounds, for instance, $R_1$ may represent phenyl, $R_2$ may represent cresyl, while $R_3$ may represent naphthyl.

In the foregoing graphic formulas an SP group may be substituted for the OP group. Whether a phosphate or a thiophosphate is produced will depend upon whether water or hydrogen sulphide is added to the reaction, as more fully illustrated by the empirical Formulas (1) and (2) set forth above.

The properties of the esters produced may be described as crystalline solids or oily liquids, light in color, odorless, neutral, inert, very stable and non-flammable. They may be distilled under reduced pressure without decomposition and they have a boiling point of approximately 300° C. at a reduced pressure of 10–15 mm. mercury. The specific gravity of the esters may vary from 1.15 to 1.22.

The aryl phosphates formed in accordance with this invention are of great importance as plasticizers in plastic compounds and coating materials. When such aryl phosphates are incorporated in plastic compositions and coating materials which contain derivatives of cellulose, such as nitrocellulose or pyroxylin, cellulose acetate and cellulose ethers, for instance, benzyl cellulose, and which may contain resins, due to their low vapor pressure, they remain a part of the solid constituents in forming films even at elevated temperatures, thus keeping the films plastic and flexible and making them more durable. The aryl phosphates are also solvents or partial solvents for cellulose esters and resins and, therefore, materially aid in their absorption to produce homogeneous products.

The aryl phosphates produced in accordance with this invention may also be used extensively as absorbing agents in recovery systems for solvents and for phenols in gas liquors. The aryl phosphates also find an important use in air purifying apparatus for absorbing obnoxious vapors and entrapping dust or other solid particles.

The aryl phosphates produced in accordance with this invention may also be employed as plasticizers in wax coatings, as fire and waterproofing agents, as vehicles for grinding pigments, as the sole constituent or as a diluent in transformer oil, as lubricants with or without other modifying agents, as joint compounds for electrical cables, as softeners and modifiers for rubber, chlorinated rubber and resins, in soaps, in polishes, in inks, as rust-proofing agents, in leather finishes, in fur dressing, in insecticides and mothproofing agents and in caulking compounds. The aryl phosphates produced in accordance with this invention, and especially tricresyl phosphate, may be employed as the lubricant in gas compressing devices whether said device be of the piston type or the centrifugal type. They are of particular importance in devices for compressing oxygen for medical and industrial purposes. Oxygen, when being compressed in the presence of a hydrocarbon as the lubricant for the compressor, forms explosive mixtures under the temperatures and pressures employed whereas tricresyl phosphate is not only equally as good a lubricant for the device but is also inert with respect to the oxygen; not effecting it in any way.

As an aid in describing the invention, the apparatus shown in the drawing will now be described. The apparatus may comprise a kettle, or reaction chamber 1, having a jacket 2 surrounding the same. The kettle may be of any convenient size and formed of any suitable metal lined with enamel, or it may be formed of any other corrosion resisting material. The kettle may be equipped with a reflux condenser 3. A conduit 4 leading from the kettle to the reflux condenser is provided for the purpose of carrying vapors into said reflux condenser, while a conduit 5 is provided for returning to the reaction kettle any condensate formed in the reflux condenser. A conduit 6 is provided for carrying any gas emitted from the reflux condenser to scrubber 7 adapted to absorb any hydrochloric acid coming from the reflux condenser. The scrubber 7 is provided with a conduit 8 for supplying it with an absorbing material and a conduit 9 for carrying the absorbent and absorbed hydrochloric acid to a suitable reclaiming system.

The reaction kettle is provided with an opening 11 which opening is connected by a conduit 12 to a rotary or other suitable charging and measuring device 13. The charging and measuring device 13 is connected by a conduit 14 to a hopper 15 having a funnel-shaped bottom 16. The upper part of the hopper 15, which is preferably sufficiently large to contain a drum 17 of phosphorus pentachloride, is provided with a door 18 adapted to form an opening of sufficient size to permit of the rolling of a drum into and out of the hopper. If desired, the door 18 may be placed at the top of hopper and the drum 17 charged and discharged vertically into the hopper. When the door 18 is in closed position the hopper is substantially air tight. Mounted in the upper part of the hopper and adapted to support the drum 17 are shafts 19, two in number. The shafts 19 are equipped with rollers 21 of such construction that they engage the drum and rotate the same and also prevent the drum from axial movement. The shafts 19 may be propelled by suitable mechanism 22 driven from any suitable source of power supply as an electric motor 23. The charging and measuring device 13 may also be driven from the same electric motor by means of a chain or belt 24.

Mounted in a suitable bearing 25, which is attached to the upper part of the hopper 15, is a device 26 so constructed that it may be attached to the head of the drum 17 for moving the head of the drum toward and away from said drum, or in other words, for opening and closing the drum. The hopper 15 may also be provided with an inlet 27 and an outlet 28. The inlet 27 is connected by a conduit 29 to a gas drying device 31, which in turn is connected by a conduit 32 to a source of air or other inert gas. The arrangement is such that dry air or other inert gas may be injected into the upper part of the hopper and withdrawn through the outlet 27. The air or gas is adapted to remove any vented gases from the hopper, the air or gas being dry merely for the purpose of preventing "bridging" or caking by the phosphorus pentachloride. The drying device 31 may dry the air or gas by any suitable method, such as by passing the same in contact with calcium chloride, sulphuric acid or other air drying compounds. A port or door 30 may be provided in the drying device 31 for charging it with the drying medium and for cleaning purposes. The outlet 28 is connected by a conduit 33 to the conduit 6, thus passing any gas drawn through the upper part of the hopper 15 into the scrubber 7 for the purpose of reclaiming any hydrochloric acid in the vented gases.

The reaction kettle 1 is provided with an opening 34 connected by a suitable conduit 35 to a supply tank 36 adapted to hold a measured quantity of hydroxy derivatives of an aryl compound, for instance, cresylic acid. The reaction kettle is provided with another opening 37 connected by a suitable conduit 38 to a gas moistening apparatus 39. This moistening apparatus may comprise a chamber 41 having therein a steam coil 42 connected to steam inlet 43 and outlet 44. A suitable conduit 45 is provided for injecting into the chamber 41 a suitable quantity of water. A drain and cleanout opening 46 may be provided at the bottom of the chamber 41. Above the steam coil 42 may be positioned a wire screen or perforated plate 47 for supporting a layer of material such as felt, cotton duck, etc., which layer is kept wet by the condensed vapor, which vapor is formed by the steam coils heating the water in chamber 41. Above the screen or perforated plate 47 is an inlet 48 through which air under pressure is adapted to be injected into the moistening device.

The hopper 15 is so constructed that the drum or other container of phosphorus pentachloride maybe placed in a substantially horizontal position on rollers. When the door is closed the hopper is substantially gas tight. By means of device 26 the drum head may be removed from the drum and moved any desired distance therefrom from the outside of the hopper without exposing the phosphorus pentachloride to the air. The drum may revolve on the rollers 21, or, if desired, it may be vibrated, so that the material in the drum may be removed therefrom at a slow rate. The rate of turning of the drum and the width of the opening between the drum and drum head are adapted to regulate the flow of phosphorus pentachloride into the hopper. It is desirable not to fill up the hopper as it may cause clogging and "bridging" of the phosphorus pentachloride, thereby interrupting the free feeding of same.

The air humidifier 39 is so constructed that warm saturated moist air may be fed into the reaction kettle. The moist air is preferably maintained, at the point of entrance into the reaction chamber, at a temperature of from 50–60° C. and contains approximately .006 pound of water vapor per cubic foot. Although this amount of water vapor per cubic foot is preferable, the air may contain from .01 down to as little as .0005 pound of water per cubic foot. In place of moist air, any other inert gas containing the required amount of moisture may be employed. Moist steam may also be used. As the gas entering through line 38 is employed to convey moisture into the reaction chamber and also agitate the contents of the kettle the use of air is preferable as it is accessible and allows for an ease of control of the moisture entering the reaction. However, a product having a clearer color results when moist carbon dioxide or other non-oxidizing gas is employed instead of air. The conduit 38 may extend to the bottom of the reaction kettle and the air or other gas passing through the contents of the kettle will thoroughly agitate the same.

The bottom of the reaction kettle is equipped with an opening 50 and conduits 51 and 52. Conduit 51 leads to a drain while conduit 52 connects the reaction kettle with a storage tank 53 for receiving and retaining the products of the reaction. A conduit 54 is provided to connect the supply tank with the purifying apparatus, etc. The jacket 2 of the reaction kettle is supplied with a steam inlet 55 and water outlet 56 and an inlet 57. By means of suitable valves in the lines 55, 56 and 57 steam or water may be circulated in the jacket to regulate the temperature of the reaction kettle.

As an illustration of the process and the way it is carried out when employing the apparatus shown in the drawing, the following sizes and proportions are given. For the purpose of illustration, the equipment may consist of a 200 gallon enameled, jacketed reaction kettle having a hopper large enough to hold a 55 gallon open head drum which contains 550–600 pounds of phosphorus pentachloride. A charge for the equipment described consists of 860 pounds cresylic acid and 550 pounds of phosphorus pentachloride. The cresylic acid may be of the commercial grade and contain up to 1% or more of dissolved water and up to 5% of water in suspension. By this invention a drying of the cresylic acid is made unnecessary. The cresylic acid is first charged into the reaction kettle and the phosphorus pentachloride is then added at the rate of approximately 5 pounds per minute. Warm air containing the proper amount of moisture is blown into the reaction kettle at the same time so that it enters the bottom of the retort. If the cresylic acid contains an excessive amount of water, correction may be made to the amount of water vapor introduced. This injection of air actively agitates the solution in the kettle and removes quickly the hydrochloric acid gas as it is formed. After commencement of the action, the rate of the flow of the air preferably is regulated so that slightly less moisture is present than required to cause the secondary reaction to take place as follows:

*Equation Ia:*

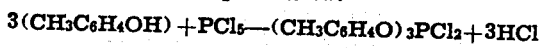
3(CH₃C₆H₄OH) + PCl₅ → (CH₃C₆H₄O)₃PCl₂ + 3HCl

*Equation Ib:*

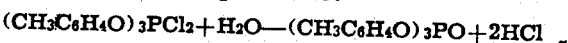
(CH₃C₆H₄O)₃PCl₂ + H₂O → (CH₃C₆H₄O)₃PO + 2HCl

When the phosphorus pentachloride has all been added, the flow of warm saturated air is continued until the reaction is complete. This may be determined by taking a sample from the reaction chamber and adding water slowly. Although it is preferred to have a slight deficiency of moisture present during the addition of the phosphorus pentachloride, this is not necessary and good yields may be obtained when there is present at all times sufficient water to cause the secondary reaction. When there is no evolution of hydrochloric acid gas with the addition of water the reaction is regarded as complete.

This process and apparatus is of substantial importance for the chemical manufacture of the aryl phosphates. In this process it is not necessary to use heat as the heat of reaction is sufficient to raise the temperature beyond the temperature desired or required so that cooling is often necessary to keep the temperature down. The temperature should not exceed 125° C. and it is preferable to keep the temperature at approximately 80° C. However, higher temperatures may be used without any substantial disadvantage. It is preferable that when the temperature exceeds 75° C. the feeding of phosphorus pentachloride be interrupted for a short time. The time cycle for making aryl phosphates by this process does not exceed 6 hours and it may be considerably shortened.

The tricresyl phosphate obtained by this process is light in color and contains some hydrochloride and phosphoric acids, free phenols and other impurities so that further refining may be required when the products are to be used for certain purposes. The yield of aryl phosphates by employing this invention may be as high as 98–99.5% of the possible theoretical yield. When employing the aryl phosphates as lubricants and for like purposes a further refining is unnecessary as the small amount of free phenols and acids that it contains are not injurious and often actually assist in forming such lubricating compounds or in the use of the compounds. However, when the aryl phosphates are to be used in connection with medicines, wrappings for food, for the manufacture of transparent plastic articles and other uses, it may be necessary to refine the same. Any method of refining aryl phosphates may be employed. For instance, the usual refining treatment may be given the aryl phosphates, when refining treatment consists in distilling the crude product under a high vacuum and washing the distillate with a hot dilute (2%) caustic solution and then with hot water to remove traces of alkali. The thus purified aryl phosphates may then be given an alkali permanganate treatment, a zinc and acid treatment or other treatments to further remove any impurities.

Although any method of refining the aryl phosphates may be employed, I prefer to use the following method in which usual distillation in refining aryl phosphates may be eliminated resulting in a saving of raw materials, thus making for a more simple and economical process. A charge of the crude aryl phosphate is put in a suitable jacketed enamel lined kettle equipped with agitators. To this charge an equal volume of hot water is added and the temperature raised to 90–95° C. Sufficient sodium sulphide or other alkali or alkali with sulphide is then added to make a 3 to 5% solution based on the water present. The material in the kettle is then agitated for 10 to 30 minutes and then allowed to stand until the aryl phosphate settles to the bottom and the aqueous solution goes to the top forming separate layers. The supernatant liquid is drawn off and an additional charge of hot water equal in volume to the first charge is added. The solution is then heated to 90–95° C. while being agitated and sufficient caustic alkali and sodium sulphide or other alkali sulphide are added so that the hot water will contain approximately 1½ to 3½% of sodium sulphide and 1 to 3% of caustic alkali. The contents of the kettle are again decanted and the aryl phosphate is washed with hot water. The aryl phosphate may then be passed through a filter to remove the sulphides which have been formed due to the treatment with sodium sulphide. To remove some impurities and color, the foregoing treatment may be modified by first treating a crude aryl phosphate with 1 to 3% of zinc powder and a small amount of mineral acid at a temperature near the boiling point of water. It is preferred to use this treatment as the final step.

Treatment with zinc and mineral acid may be as follows: The filtered partially purified aryl phosphate is washed 3 or 4 times with a dilute alkali solution so that any phenols and intermediate or unstable products remaining after the preliminary treatment may be removed. Most of the alkali is then removed by washing with hot water. There is added to the charge, in a volume equal to the aryl phosphate present, water heated to 90° C. and approximately 1% of zinc powder is stirred into the solution. Sufficient hydrochloric or sulphuric acid is then added to combine with the zinc and release nascent hydrogen. The charge is agitated during the release of the nascent hydrogen and continued for from 10 to 30 minutes and the temperature of the charge maintained at about 95° C. After the aryl phosphate separates from the water solution upon standing, it is passed through a centrifuge at a temperature above 90° C. to completely dehydrate it and remove other impurities and suspended matter. The above treatment will be found sufficient for producing a product of purity required for most uses. However, if further refining is desired to remove the last traces of impurities, the aryl phosphate may be treated with a water-soluble permanganate. The zinc treatment described in the foregoing may be given after the permanganate treatment, and this is sometimes found desirable. Other discoloring agents, such as activated charcoal, fuller's earth, aluminum or like products, may be employed for filtering impurities from the crude phosphate eliminating one or all of the purifying steps described above.

The alkali solution used in treating aryl phosphates may be formed of the hydroxides of any of the alkali metals or alkali earth metals or mixtures of the same. Hydrogen or sodium peroxide may be used in connection with the alkali washes to remove oxidizable impurities. Mono-sodium (sodium peroxide) oxide may also be used for this purpose.

In place of using the zinc and acid treatment, an electric current may be passed through a charge maintained in hot water, between zinc electrodes, or one zinc electrode and an electrode of another material such as carbon.

It is to be understood that the foregoing detailed description is given merely by way of illustration and that many variations may be made therein without departing from the spirit of my invention.

Having described my invention, what I desire to secure by Letters Patent is:

1. Process for the manufacture of an organic phosphate or thiophosphate, which comprises subjecting phosphorus pentachloride, a hydroxy carbocyclic compound containing a hydroxy group attached to the nucleus and a substance selected from the group consisting of water and hydrogen sulphide to reaction in a single operation.

2. Process for the manufacture of an organic phosphate or thiophosphate, which comprises simultaneously feeding phosphorus pentachloride and a substance selected from the group consisting of water vapor and hydrogen sulphide into a reaction vessel containing a hydroxy carbocyclic compound containing a hydroxy group attached to the nucleus.

3. Process according to claim 2, wherein the water or hydrogen sulphide is introduced into the reaction zone in admixture with an inert gas.

4. Process for the manufacture of an organic phosphate or thiophosphate, which comprises simultaneously feeding phosphorus pentachloride and a substance selected from the group consisting of water vapor and hydrogen sulphide in admixture with air into a reaction vessel containing a hydroxy carbocyclic compound containing a hydroxy group attached to the nucleus.

5. Process for the manufacture of an aryl phosphate or thiophosphate, which comprises subjecting phosphorus pentachloride, a phenol and a substance selected from the group consisting of water and hydogen sulphide to reaction in a single operation.

6. Process for the manufacture of an organic phosphate, which comprises subjecting phosphorus pentachloride, a hydroxy carbocyclic compound containing a hydroxy group attached to the nucleus and water to reaction in a single operation.

7. Process for the manufacture of an organic phosphate, which comprises subjecting phosphorus pentachloride, a hydroxy carbocyclic compound containing a hydroxy group attached to the nucleus and water to reaction in a single operation at a temperature below 80° C.

8. Process for the manufacture of an organic phosphate, which comprises simultaneously feeding phosphorus pentachloride and water vapor into a reaction vessel containing a hydroxy carbocyclic compound containing a hydroxy group attached to the nucleus.

9. Process for the manufacture of an aryl phosphate, which comprises subjecting phosphorus pentachloride, a phenol and water to reaction in a single operation.

10. Method of making organic thiophosphates, which comprises the step of reacting a cyclic hydrocarbon having an OH group attached to the nucleus with phosphorus pentachloride in the presence of hydrogen sulphide.

11. Method of making aryl thiophosphates, which comprises the step of reacting phenols with phosphorus pentachloride in the presence of hydrogen sulphide.

12. Method of making organic thiophosphates, which comprises the step of reacting a cyclic hydrocarbon having an OH group attached to the nucleus with phosphorus pentachloride in the presence of hydrogen sulphide and at a temperature below 80° C.

13. Method of making aryl thiophosphates, which comprises the step of reacting phenols with phosphorus pentachloride in the presence of hydrogen sulphide and at a temperature below 80° C.

14. Method of making organic phosphates, which comprises the step of reacting a cyclic hydrocarbon having an OH group attached to the nucleus with phosphorus pentachloride in the presence of a quantity of moisture slightly insufficient to remove the chlorine connected to the phosphorus atom.

15. Method of making organic phosphates, which comprises the steps of reacting a cyclic hydrocarbon having an OH radicle attached to the nucleus with phosphorus pentachloride, treating the resulting product with an aqueous solution of an alkali sulphide and removing water-soluble constituents.

16. Method of making organic phosphates, which comprises the steps of reacting a cyclic hydrocarbon having an OH radicle attached to the nucleus with phosphorus pentachloride in the presence of moisture, treating the resulting product with an aqueous solution of an alkali sulphide and removing water-soluble constituents.

17. Method of making aryl phosphates, which comprises the steps of reacting phenols having an OH radicle attached to the nucleus with phosphorus pentachloride, treating the resulting product with an aqueous solution of an alkali sulphide and removing water-soluble constituents.

18. Method of making tricresyl phosphate, which comprises the steps of reacting cresol with phosphorus pentachloride in the presence of moisture and treating the resulting product with an aqueous solution of an alkali sulphide.

19. Method of making triphenyl phosphate, which comprises the steps of reacting phenol with phosphorus pentachloride in the presence of moisture and treating the resulting product with an aqueous solution of an alkali sulphide.

ROYAL L. SHUMAN.